(12) United States Patent
Spruit

(10) Patent No.: US 6,407,969 B1
(45) Date of Patent: Jun. 18, 2002

(54) INFORMATION CARRIER WITH A COMPACT HEADER FORMAT AND APPARATUS

(75) Inventor: Johannes H. M. Spruit, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/417,287

(22) Filed: Oct. 13, 1999

(30) Foreign Application Priority Data

Oct. 21, 1998 (EP) .............................. 98203547

(51) Int. Cl.[7] ................................................ G11B 3/90
(52) U.S. Cl. .................................. 369/53.34; 369/275.3
(58) Field of Search ............................ 369/275.3, 53.2, 369/47.28, 47.31, 47.47, 47.48, 53.34, 32.01; 360/48, 49

(56) References Cited

U.S. PATENT DOCUMENTS 5,383,176 A    1/1995   Inui et al. ................ 369/275.4
5,740,154 A    4/1998   Izumi et al. ............. 369/275.3

FOREIGN PATENT DOCUMENTS

| EP | 0740290 A2 | 10/1996 |
|---|---|---|
| JP | 09237473 A | 9/1997 |

Primary Examiner—Paul W. Huber
(74) Attorney, Agent, or Firm—Michael E. Belk

(57) ABSTRACT

An information carrier has a pattern of substantially parallel tracks, each track includes a number of sectors and each sector includes an address-information area and an accompanying data area. In the address information areas, the so-called headers, immediately follow the data areas. These headers are composed of at least one address information field and at least one synchronization field and the address information areas in adjacent tracks overlap each other. The address information fields in adjacent tracks are positioned free of overlap relative to each other while adjacent synchronization fields overlap address information fields. This provides a more compact header. Apparatus for reading the information carrier uses a synchronization or a lock-in signal resulting from the reading of the synchronization fields, and the length of the synchronization fields is detected enabling a reliable read-out of the address information fields.

16 Claims, 4 Drawing Sheets

INFORMATION CARRIER WITH A COMPACT HEADER FORMAT AND APPARATUS

BACKGROUND OF INVENTION

The invention relates to an information carrier including a pattern of substantially parallel tracks, each track including a plurality of sectors and each sector including an address information area and an associated data area, the data area being a continuation of the address information area and the address information area including at least one address information field and at least one synchronization field, and the address information areas in adjacent tracks overlapping each other, the address information fields in overlapping address information areas being positioned free from overlap relative to each other.

The invention further relates to an apparatus for reading the information carrier, including an optical system for detecting optically readable signs by generating a light spot on the information carrier, a tracking unit for controlling the position of the light spot and a reading unit for reading the address information.

An information carrier and apparatus of this type are known, for example, from Japanese patent application JP 09237473 A, (document D1). This document describes an information carrier which includes address information areas, the so-called headers, and data areas and an apparatus. The address information areas belong to and are continuations of the data areas directly following these address information areas. These address information areas include address information fields which are fields containing address information, and synchronization fields which are fields providing that a phase-locked loop (PLL) can synchronize a clock signal on the basis of optically readable signs on the information carrier. In this manner the address information fields can be read. The synchronization fields provide a reliable synchronization before information in the form of address information fields or data fields is read or written. For the signals to be strong enough when the address information areas are read, these areas are placed in line with the data areas. The headers are distributed over the various tracks present on the information carrier. The whole is also called the header structure.

Document D1 explains that, after each field containing synchronization fields and address information fields, hereinafter called sync/address field, one field is left empty. This is done to reduce the danger of address information fields of adjacent tracks being detected as a result of crosstalk. These sync/address fields occur in address information areas overlapping adjacent address information areas. A field that is left empty contains neither synchronization fields nor address information fields. As such a field is left empty, the dimensions of the address information areas are increased and this detrimentally affects the total storage capacity of the information carrier.

Those skilled in the art should refer to U.S. pat. No. 5,383,176 (Document D2).

The above references are hereby incorporated in the whole by reference.

SUMMARY OF THE INVENTION

It is an object of the invention to provide such a header structure that a larger storage capacity of the information carrier can be reached, while a reliable reading of the address information is possible.

For this purpose, an information carrier as described in the opening paragraph according to the invention has synchronization fields in overlapping address information areas, overlap the address information fields.

By having the adjacent synchronization fields overlap, a more compact header structure is reached than the structure known from document D1. As a result of this more compact structure, the headers on the information carrier take up less space, so that more room is left for the data areas. This achieves a larger capacity of this information carrier.

The invention is based inter alia on the recognition that the crosstalk as a result of the synchronization fields is less than the crosstalk as a result of the address information fields. The synchronization field, for that matter, contains in essence relatively short marks, so that a relatively high frequency signal is generated for synchronizing the clock signal. Such relatively short marks cause less crosstalk than relatively long marks which occur in the address information field and generate a relatively low frequency signal. This provides the possibility of positioning the address information fields beside the synchronization fields in the adjacent tracks and providing a reduction of the size of the header while maintaining a reliable header detection.

The reason for relatively short marks causing less crosstalk than relatively long marks will be explained as follows. When a track is read out, also the adjacent track provides a contribution to the reading signal because the dimension of the laser beam is larger than the width of the track to be read out. In the case where relatively short marks occur in this track, the contribution of these marks to the total reading signal will be smaller than in the case where there are relatively long marks in the track. This is caused, on the one hand, by the fact that small marks simply provide less modulation. On the other hand, this little modulation is further mitigated because the effective spot-size in the adjacent track is larger than in the track to be read out.

Another header structure is known from United States patent U.S. Pat. No. 5,383,176, (document D2). The reduction of the header that is realized in this case is, however, smaller than the reduction of the header realized in the header structure described here. In document D2, part of the header is placed in the land/groove area as a result of which, as is known, a reduction of the crosstalk is obtained by the use of lands and grooves. A disadvantage of this header structure is the fact that because part of the header is placed in the land/groove area, the reading signals of the header in the land/groove area deviate from the reading signals of the header in the rest of the header. This complicates the detection.

In a further embodiment the address information areas contain at least two address information fields and at least two synchronization fields, the address information fields and the synchronization fields being arranged alternately.

By composing an address information field in this manner, it is possible to render the address information available twice in a compact structure. Compared with document D1, this structure results in a size reduction of 37.5% in the case where there are two address information fields and two synchronization fields of equal size. Since the synchronization fields are generally larger than the address information fields, the reduction will be even higher.

In a further embodiment the address information areas in the two tracks adjacent to a track have an identical subdivision of address information fields and synchronization fields.

In a further embodiment the address information areas have a subdivision in which the synchronization fields in the two tracks lying adjacent to a track are substantially in identical positions.

These previous two embodiments are advantageous in that the information carrier carries only a limited number of different types of address information areas. As a result, it is possible for the address information available in the address information areas to be read out in a simple and reliable manner. In addition, the manufacturing of information carriers having space reserved for the address information areas is simplified.

In a further embodiment the synchronization fields in the tracks adjacent to the track to be read out have a mutual shift of the order of several bits.

In a further embodiment the shift of synchronization fields in the two tracks adjacent to the track to be read out is so large that pits in one track adjacent to the track to be read out correspond to spaces in the other track adjacent to the track to be read out. Spaces in this case are meant to be understood as the areas between the pits.

These previous two embodiments are advantageous in that the crosstalk is even further reduced. Since the synchronization fields in the tracks adjacent to the track to be read out have a mutual shift of the order of several bits. the signals coming from the tracks adjacent to the track to be read out cancel each other out. This further reduces the crosstalk.

According to a second aspect of the invention. an apparatus as defined in the opening paragraph includes a detector means for detecting the length of the synchronization fields.

The apparatus is advantageous in that, as the length of the synchronization fields is known, the reading of the address information fields can be started at the right moment. As a result, the chance is made slimmer that part of the address information area is mistaken for an address information field. The robustness of the header detection is increased as a result of this. Besides, knowing the length of the synchronization fields can be used for varying the properties of the detection of the signal coming from the information carrier.

These and other aspects of the invention are apparent from and will be elucidated by the detailed description of embodiments below with reference to the following drawings.

DETAILED DESCRIPTION OF THE PREFERRED EMBODIMENTS

Figure 1:
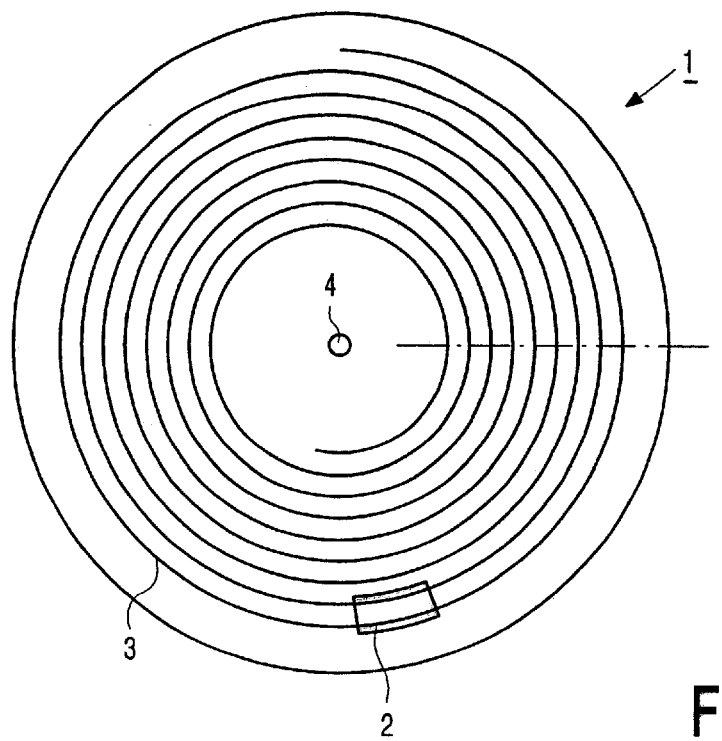
FIG. 1 gives a diagrammatic representation of an information carrier.

FIG. 1 shows a concentrically formed information carrier 1 which may contain information, with a track 3 and an opening 4 lying in the center. The track 3 is arranged in a spiral or concentric pattern and include sectors which contain data areas and address information areas.

Figure 2:
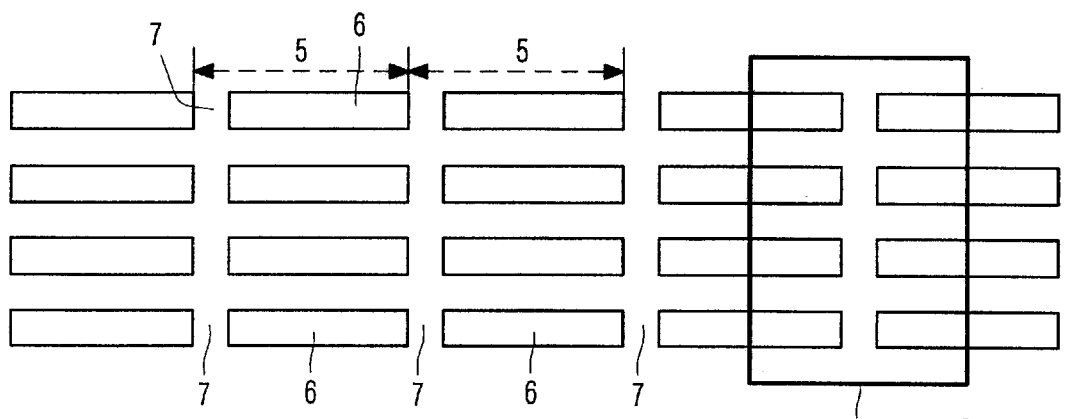
FIG. 2 shows an enlargement of part of FIG. 1 containing data areas and address information areas, FIG. 3 gives a diagrammatic representation of the header structure as described in document D1.

FIG. 2 is an enlargement of an area 2 of FIG. 1. The track 3 is subdivided here into sectors 5 which are individually accessible for writing or reading functions. The sectors 5 contain data areas 6 and address information areas 7 preceding the data areas 6. The address information areas 7 are referenced headers.

Figure 3:
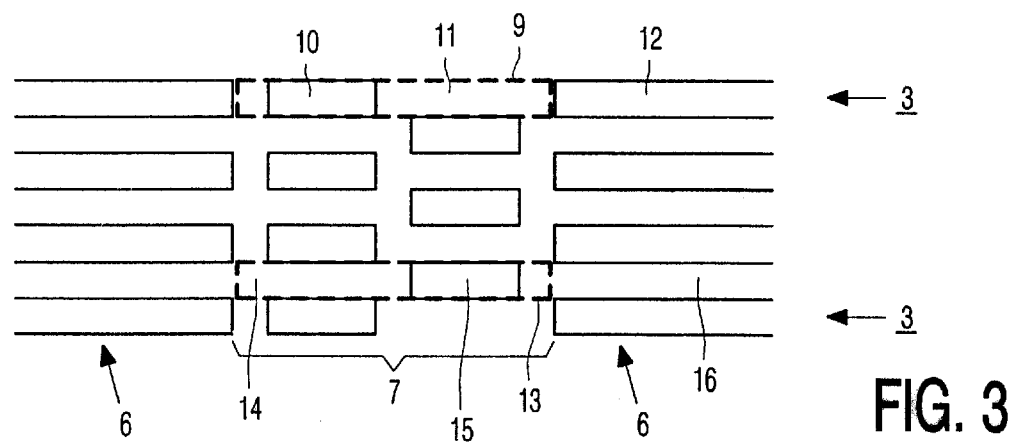

FIG. 3 shows an enlargement of an area 8 of FIG. 2. FIG. 3 represents the header structure as described in document D1. In FIG. 3 the address information areas 7 are positioned in between the data areas. The data areas are positioned, for example, in land/groove areas. This land/groove structure is then interrupted by the flat address information areas. The address information areas 7 are used for storing address information areas of a first type 9 and address information areas of a second type 13. The address information areas of a first type include sync/address field followed by a free space, whereas the address information areas of a second type include a free space followed by a sync/address field. These address information areas contain address information and indicate the beginning of a data area.

In this Figure, the address information areas 7 are in line with the data areas 6. The address information area of the first type 9 in this case includes sync/address field 10 and a free space 11. A sync/address field 10 is meant to be understood as a field containing address information fields and synchronization fields. After this address information area of the first type 9, a data area 12 continues the track 3. An address information area of the second type 13 interrupts another part of the track 3. This address information area of the second type 13 in this case includes a free space 14 followed by a sync/address field 15. After this address information area of the second type 13, a data area 16 continues the track.

Figure 4:
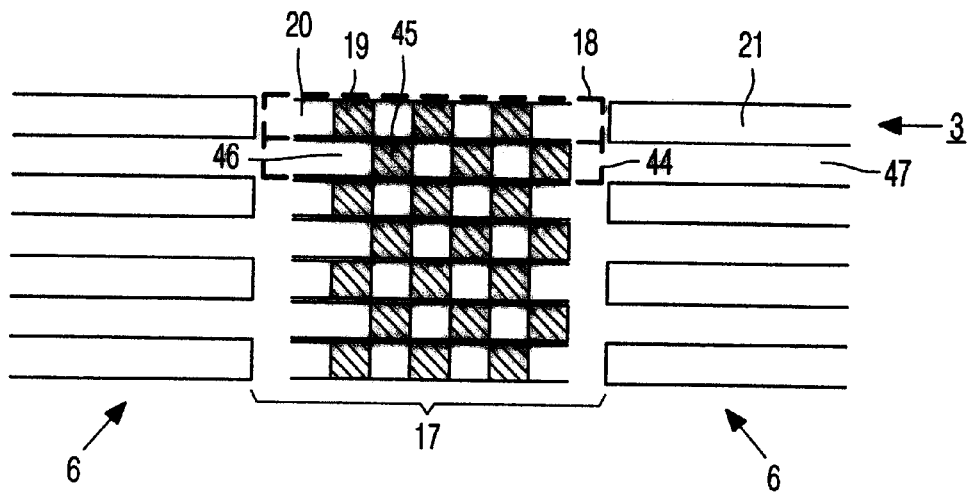
FIG. 4 shows an embodiment of the header structure as described in the present invention.

FIG. 4 gives a diagrammatic representation of a possible embodiment of the present invention and is in itself an enlargement of the area 8 of FIG. 2. In this embodiment the address information areas in the tracks adjacent to the track to be read out have an identical subdivision. The address information area 17 also in this case includes an interrupted part between the data areas 6. In this case the address information areas 17 are again put in line with the data areas 6.

The address information area of the first type 18 in this case includes address information fields 19 and synchronization fields 20. After this address information area of the first type 18, a data area 21 continues the track 3. The address information area of the second type 44 in this case includes address information fields 45 and synchronization fields 46. After this address information field of the second type 44, a data area 47 continues the track 3. By placing the different address information fields 19 and 45 and the different synchronization fields 20 and 46 in the manner described above, there is provided that the synchronization fields overlap address information fields in overlapping address information areas.

Assuming that the address information area of the first type 18 includes N address information fields 19 and N synchronization fields 20, the described structure results in a size reduction of $100(N-½)/2N\%$ if the fields 19 and 20 are of the same size. Since the synchronization fields 20 are generally larger than the address information fields 19, the reduction will be even greater. An address information area may include, for example, a first synchronization field having length 5a, followed by an address information field having length a, followed by a synchronization field having length 2a, followed by an address information field having length 1a.

In the above Figures, a header is started from where land/groove recording is applied. It should be observed that for groove-only recording or for land-only recording the invention may be applied in similar manner. In addition, the invention may also be applied to situations where the data area is not in line with the address information area, but staggered.

The number of address information fields present in the address information areas determines the robustness for detecting errors and correcting them. A large number of address information fields will considerably increase the chance of detection and correction but, at the same time, also detrimentally affect the size of the total header. In this respect an optimum is to be found depending of the desired application.

Figure 5:
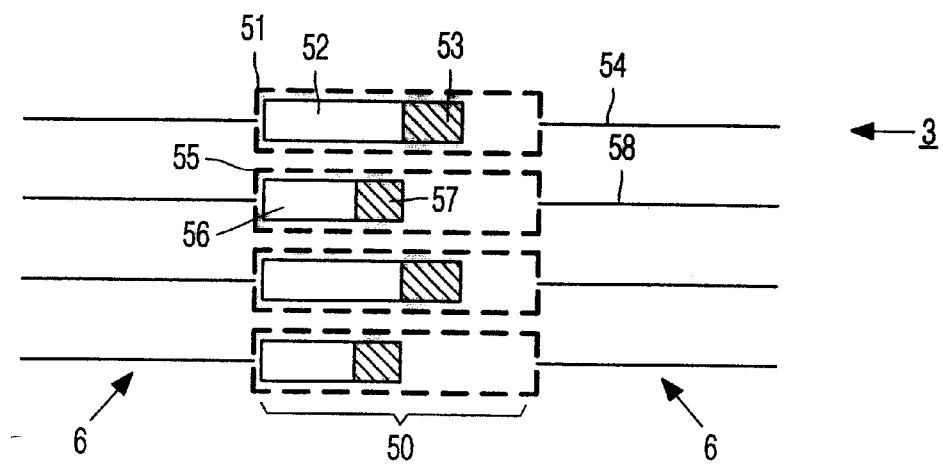
FIG. 5 shows another embodiment of the header structure as described in the present invention, FIG. 6 gives an example of a possible synchronization field on an information carrier.

FIG. 5 gives a diagrammatic representation of another possible embodiment of the present invention. In this embodiment. the synchronization fields have different lengths. FIG. 5 shows an address information area 50 in an interrupted section between the data areas 6. The address information area of the first type 51 in this case includes synchronization fields 52 and address information fields 53. After this first type of address information area 51 the track 3 is continued with a data area 54. The second type of address information area 55 in this case includes synchronization fields 56 and address information fields 57. After this second type of address information area 55 a data area 58 continues the track 3. The synchronization fields 52 and the synchronization fields 56 in this case have different lengths.

Figure 6:
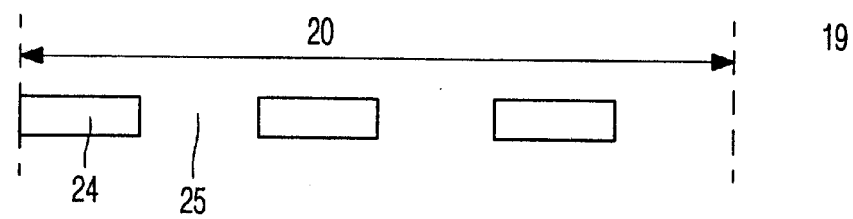

FIG. 6 gives a diagrammatic example of a possible embodiment of the synchronization field 20. Also in this case an address information field 19 follows the synchronization field 20. The synchronization field 20 includes a so-called 3T pattern. This pattern includes alternate pits 24 having length 3T and lands 25 having length 3T. The reading of this pattern causes a relatively high-frequency reading signal to occur on reading out.

Figure 7:
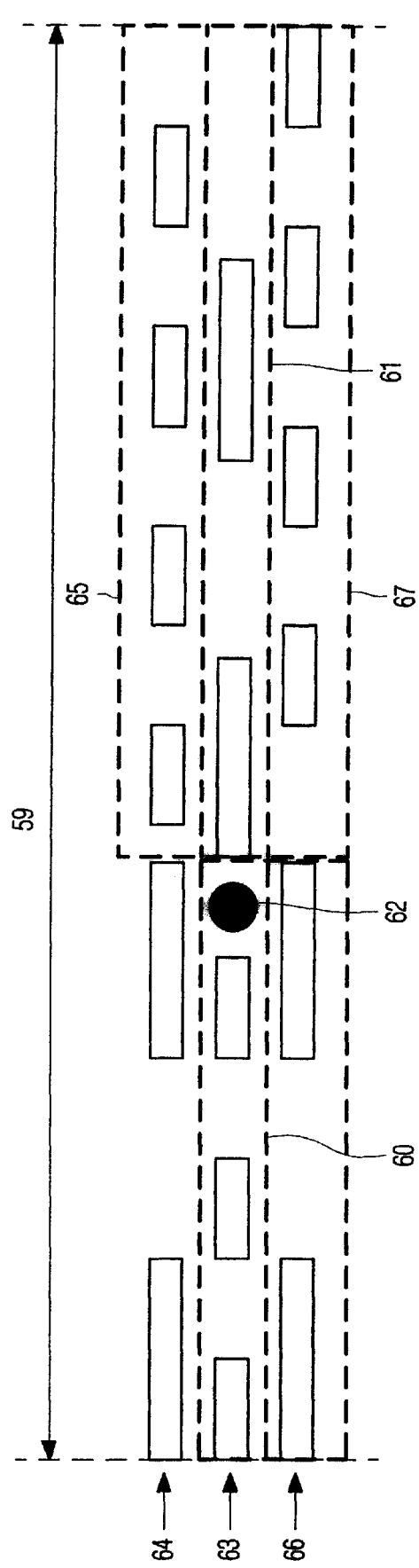
FIG. 7 shows an example of the reading of a synchronization field and an address information field, and FIG. 8 gives a diagrammatic representation of an apparatus used for reading an information carrier. Like elements of different drawing Figures have like reference characters.

FIG. 7 shows an example of the reading of an address information field 61 including pits and spaces having length 6T. A synchronization field 60 which includes pits and spaces having length 3T precedes this address information field 61. The synchronization fields and the address information fields together form the address information area 59. A light spot 62 reads out the address information field 61. Since the diameter of the laser beam is larger than the width of the track 63 to be read out also part of the adjacent track 64 will be read out. Besides the address information field 61 in track 63, relatively short marks originating from a synchronization field 65 lie in the adjacent track 64. The crosstalk then occurring will therefore be less than during the undesired reading of relatively long marks. In the other adjacent track 66 beside the address information field 61 in track 63 there are relatively short marks originating from a synchronization field 67. The relatively short marks in this synchronization field are oppositely phased relative to short marks from the synchronization field 65.

Figure 8:
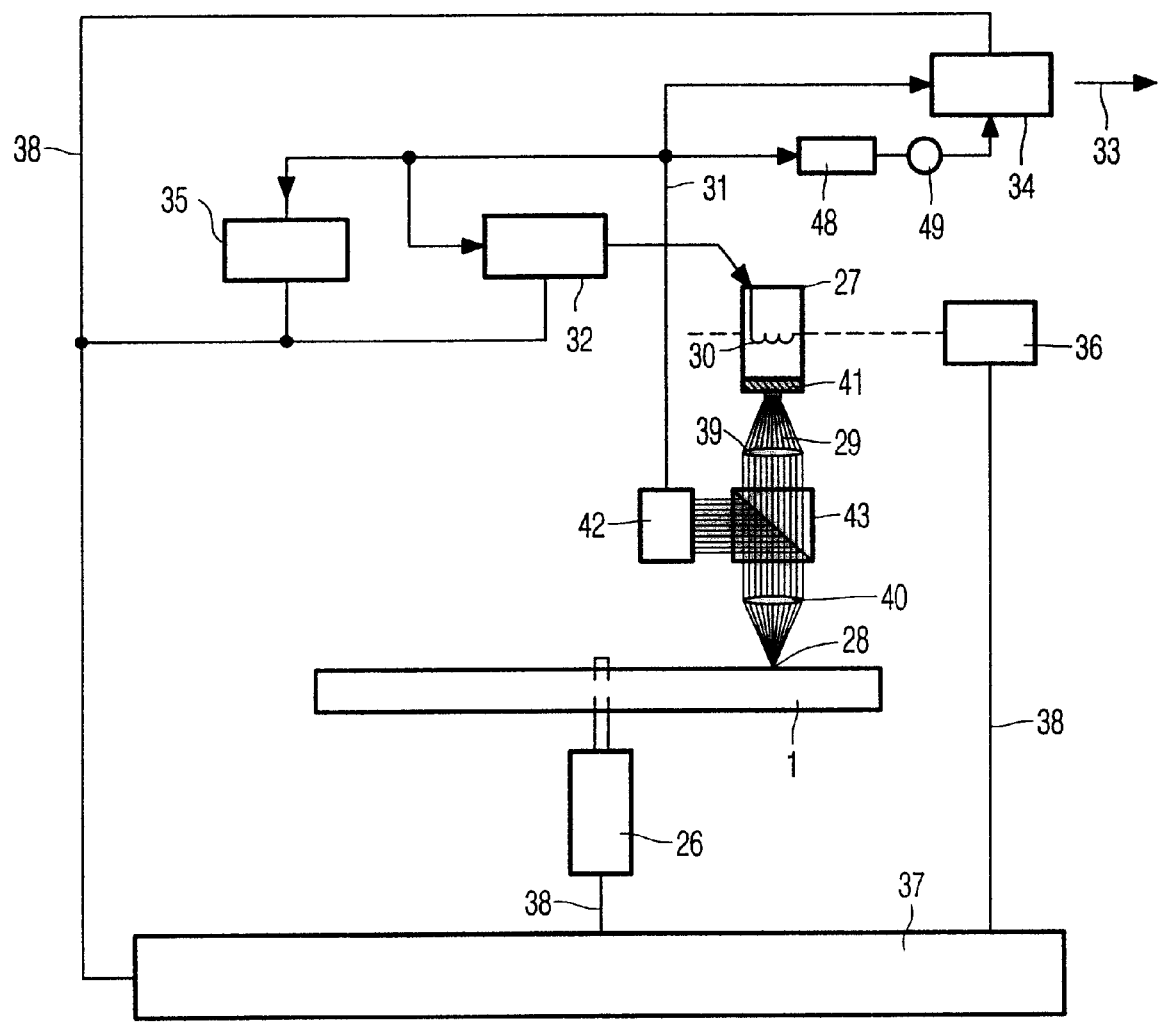

FIG. 8 shows an apparatus provided for reading the information carrier 1. The apparatus includes drive motor 26 for rotating the information carrier 1 and a read head 27 for reading the tracks on the information carrier. The read head 27 includes an optical system of a known type intended to generate a light spot 28 focused at a track of the information carrier by means of a light beam 29 guided by optical elements such as a collimator lens 39 for collimating the light beam, and an objective lens 40 for focusing the light beam. This light beam 29 is generated by a radiation source 41. for example, an infrared laser diode having a wavelength of 780 nm and an optical power of 3 mW. The read head 27 further includes an actuator intended to focus the light beam 29 at the information carrier, and a tracking actuator 30 for fine-tuning the light spot 28 in radial direction in the middle of the track. The track may also be followed with the laser beam by varying the position of the objective lens 40. The light beam 29, after being reflected by the information carrier, is detected by a detector 42 of a known type, for example, a quadrant detector and generates detector signals 31 that include a reading signal, a tracking error signal, a focusing error signal, a synchronization signal and a lock-in signal. For this purpose, a beam splitting cube 43, a polarizing beam splitting cube a pellicle or a retarder may be used.

The apparatus includes tracking unit 32 coupled to the read head 27, for receiving the tracking error signal from the read head 27 and for regulating the tracking actuator 30. During the reading process the reading signal is converted into output information indicated by an arrow 33 in the reading unit 34 which includes, for example, a channel decoder and an error corrector. The apparatus includes an address detector 35 for detecting the address information fields as described in the invention and for deriving address information from the detector signals 31 when the address information fields of the tracks on the information carrier are read out, and positioning units 36 for coarsely positioning the read head 27 in the radial direction of the track.

The apparatus further includes detection units 48 for receiving detector signals 31 from the read head 27. The presence and absence of these detector signals 31 is transmitted to the timer 49 so as to synchronize the reading units 34 for reading the address information fields. The apparatus further includes a system control unit 37 intended to receive commands from a controlling computer system or from a user and for controlling the apparatus by means of control lines 38, for example. a system bus connected to the drive units 26, the positioning unit 36, the address detector 35 the tracking unit 32 and the reading units 34. For this purpose, the system control unit 37 includes a control circuit, for example, a microprocessor, a program memory and control gates for executing the procedures as described below. The system control unit 37 may also be used in a status machine in logic circuits.

After the data area belonging to the most recent reading instruction has been read out completely, the address information area is read out by the read head 27 and the address information fields are detected by the address detector 35. The detection unit 48 indicate the presence and absence of the synchronization signal (this signal is one of the detector signals 31) resulting from the reading of the synchronization fields, to the timer 49 so as to synchronize the reading unit 34 to read out the address information fields. The reading of the timer by the reading unit 34 determines the length of the synchronization fields.

Knowledge of the length of the synchronization fields may be used to start reading the address information fields at the right moment. If the header structure is known, that, for example, the address information areas have the property of having an identical subdivision in the two tracks adjacent to each track, the length of the arriving synchronization fields can be forecast. The synchronization fields then alternately have a length a and a length b.

Similarly, a check of the track number can be performed since, for example, all even track numbers are stored in an address information field belonging to a synchronization field having length a and all odd track numbers are stored in an address information field belonging to a synchronization field having length b. When the length of the different synchronization fields is determined, also so-called header marks indicating the beginning of a header can be used.

Besides, the lock-in process in which a voltage-controlled oscillator is synchronized by a phase-locked loop (PLL) regenerating a clock signal, can be adapted if there can be detected at what moment a synchronization field begins and how long it is.

In another embodiment the lock-in signal (this signal is one of the detector signals 31) is used in a comparable manner for determining the length of the synchronization fields. In this case, not the absolute length of the synchronization fields is determined but the relative length with which the voltage-controlled oscillator is synchronized. However, this also provides a measure for the length of the synchronization fields.

In another embodiment, the apparatus may include, in addition to reading, unit 34, also a writing unit for providing optically readable signs on an information carrier of a writable type, so that it is possible for the apparatus to perform both reading and writing functions.

Although the invention as such is clarified with reference to the above embodiments, it is evident that also other embodiments may be used for achieving the same goal. Furthermore, the invention is deemed to be present in any new characteristic feature and/or combination of characteristic features.

What is claimed is:

1. An information carrier comprising:
   a substrate; and
   a pattern of substantially parallel tracks on the substrate, each track including a plurality of sectors, and each sector including: an address information area; and an associated data area, the data area immediately following the address information area and the address information area including: at least one address information field: and at least one synchronization field, wherein a free space precedes the address information field and the synchronization field, the address information areas in adjacent tracks overlapping each other, the address information fields in overlapping address information areas beings positioned free from overlap relative to each other, and the synchronization fields in overlapping, address information areas, overlap the address information fields.

2. The carrier of claim 1, in which the address information areas contain at least two address information fields and at least two synchronization fields, the address information fields and the synchronization fields being arranged alternately along the track.

3. The carrier of claim 2, in which the address information areas in the two tracks adjacent to a track have an identical subdivision of address information fields and synchronization fields.

4. The carrier of claim 3 in which the address information areas have a subdivision in which the synchronization fields in the two tracks adjacent to a track are substantially radially aligned.

5. The carrier of claim 2 in which the synchronization fields in the tracks adjacent to the track to be read out have a shift of the order of several bits relative to each other.

6. The carrier of claim 5, in which the shift of synchronization fields in the two tracks adjacent to the track to be read out is so large that pits in one track adjacent to the track to be read out correspond at least approximately to spaces in the other track adjacent to the track to be read out.

7. The carrier of claim 1, in which the length of the synchronization fields is not the same for all the tracks.

8. The carrier of claim 1, in which the address information areas in the two tracks adjacent to a track have an identical subdivision of address information fields and synchronization fields.

9. The carrier of claim 8 in which the address information areas have a subdivision in which the synchronization fields in the two tracks adjacent to a track are substantially radially aligned.

10. The carrier of claim 1 in which the synchronization fields in the tracks adjacent to the track to be read out have a shift of the order of several bits relative to each other.

11. The carrier of claim 10, in which the shift of synchronization fields in the two tracks adjacent to the track to be read out is so large that pits in one track adjacent to the track to be read out correspond at least approximately to spaces in the other track adjacent to the track to be read out.

12. An information carrier comprising:
   a substrate; and
   a pattern of substantially parallel tracks on the substrate, each track including a plurality of sectors, and each sector including: an address information area; and an associated data area, the data area immediately following the address information area and the address information area including: at least one address information field; and at least one synchronization field, the address information areas in adjacent tracks overlapping each other, the address information fields in overlapping address information areas being positioned free from overlap relative to each other, and the synchronization fields in overlapping address information areas, overlap the address information fields, wherein the synchronization fields are adapted to have their lengths detected by a detection means.

13. Apparatus comprising:
   an optical system for detecting optically readable marks on a track of an information carrier by generating a light spot on the information carrier;
   tracking means for controlling the radial position of the light spot with respect to a track to be read;
   reading means for reading address information from a pattern of substantially parallel tracks on the information carrier, each track including a plurality of sectors, and each sector including: an address information area and an associated data area, the data area immediately following the address information area and the address information area including: at least one address information field; and at least one synchronization field, the address information areas in adjacent tracks overlapping each other, the address information fields in overlapping address information areas being positioned free from overlap relative to each other, and the synchronization fields in overlapping address information areas, overlap the address information fields; and
   detection means for detecting the length of the synchronization fields.

14. The apparatus of claim 13, in which the detecting means are adapted for using a synchronization signal resulting from the reading of the synchronization field for detecting the length of the synchronization fields.

15. The apparatus of claim 13, in which the detecting means are adapted for using a lock-in signal resulting from the reading of the synchronization fields for detecting the length of the synchronization fields.

16. The apparatus of claim 13, in which the apparatus further comprise writing means for providing optically readable signs on an information carrier of a writable type.

* * * * *